Sept. 11, 1923.                                           1,467,798
                      O. C. KRAENNIG ET AL
            TAIL LIGHT AND LICENSE PLATE HOLDER FOR VEHICLES
                      Filed Nov. 17, 1922
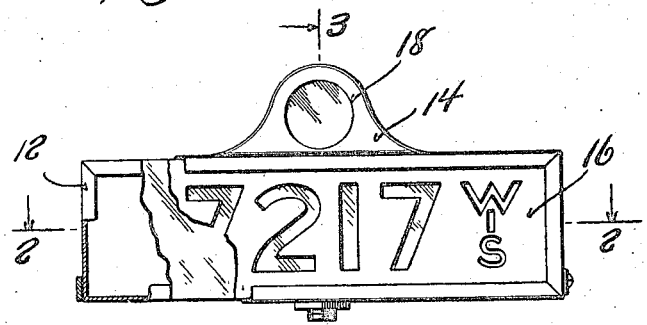
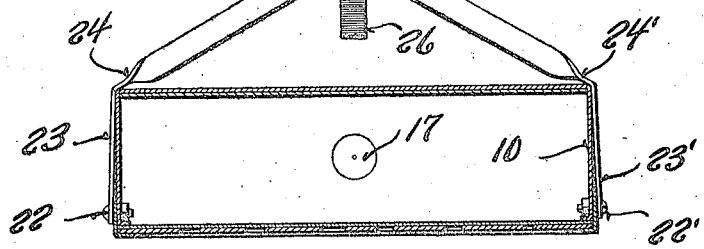
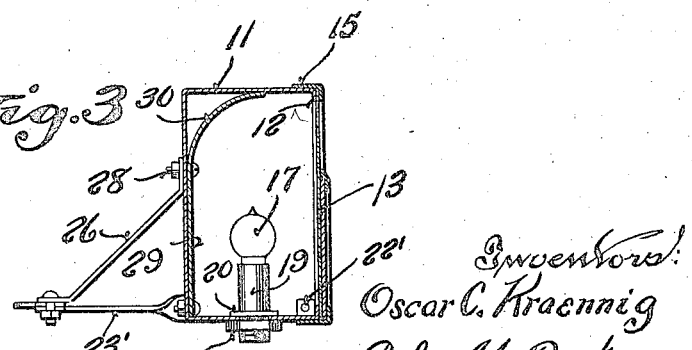

Patented Sept. 11, 1923.

1,467,798

UNITED STATES PATENT OFFICE.

OSCAR C. KRAENNIG AND JOHN M. REITER, OF GREEN BAY, WISCONSIN.

TAIL-LIGHT AND LICENSE-PLATE HOLDER FOR VEHICLES.

Application filed November 17, 1922. Serial No. 601,494.

*To all whom it may concern:*

Be it known that we, OSCAR C. KRAENNIG and JOHN M. REITER, both citizens of the United States, and residents of Green Bay, in the county of Brown and State of Wisconsin, have invented certain new and useful Improvements in Tail-Light and License-Plate Holders for Vehicles; and we do hereby declare that the following is a full, clear, and exact description thereof.

The invention comprises a housing, a cap therefor having an opening adapted to serve for tail-light purposes, a license plate with the numbers thereon cut-out so as to be rendered visible by the lamp, and supports for securing the housing to a vehicle.

An object of the invention is the provision of a device carrying a license plate which is visible for inspection in the daytime and illuminated at night, at which time, also, a tail-light is illuminated. An advantageous feature is the provision of a single lamp the single light operating both for tail-light purposes and to make apparent the license number. A single reflector is provided for both the tail-light and the license plate. These features make for economy.

An object is the provision of a structure adapted to carry various license plates, the assembly of a plate with the novel parts being convenient, as is also the change of one plate for another. A cap retains the plate in position, the cap being secured by a pair of bolts. On the removal of a cap, the plates may be changed.

A further object of the invention is the provision of a construction that is compact, small, neat in design, made of few parts, and simple in construction. The cap is retained in position by two bolts which also serve to secure a pair of supports and a single bolt is provided for the reflector and brace.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof, and in which:—

Figure 1 is a rear elevation with parts broken away to better illustrate the construction.

Figure 2 is a section on the line 2—2 of Figure 1, and

Figure 3 is a section on the line 3—3 of Figure 1.

Housing 10 is rectangular in horizontal section and its upper wall is provided with an extension 11. The rear wall has a large opening therein and is bordered by a narrow inturned flange 12. Against the flange a colored diaphragm 13 is positioned which may be of glass, or any suitable transparent material, even of a flexible nature, and retained in position by a cap 14 having a forwardly extending flange 15 fitting snugly against the housing. A license plate 16 is received between the diaphragm and the cap, the cap being cut away to reveal the license plate which is rectangular in shape. The cap extends for a short distance over the license plate adjacent the edges thereof. The license plate is cut away, as shown in Figure 1, to provide suitable insignia which is illuminated by lamp 17 disposed behind the license plate and rendering visible the colored diaphragm 12. Cap 14 has a round opening 18 therein above the license plate over which the diaphragm 12 extends operating to supply a tail-light. Obviously, the number on the license plate is visible both in the daytime and at night.

The lamp 17 is received in a socket 19 having a collar 20 thereon, the socket extending through an opening in the bottom wall of the housing on which collar 20 rests, the lower part of the socket being threaded to receive a nut 21 clamping the bottom tightly against the collar. The flange 15 of cap 14 is apertured on each end wall to receive bolts 22—22′, which extend through the housing and the ends of supports 23—23′, which are of narrow strap metal and extend rearwardly, lying along the surface of the ends of the housing.

At the forward corners, the supports are bent and immediately adjacent the bend, at points 24—24′, they are twisted a quarter of a revolution. The supports cross adjacent their ends and are secured together by a bolt 25 which also unites with them a brace 26. The supports are provided with openings 27—27' at their ends by which they may be secured suitably to the vehicle.

Brace 26 extends upwardly to the front wall of the housing and is secured thereto by bolt 28 which extends through the housing and reflector 29 which lies snugly along the rear wall of the housing from the lowermost portion thereof to bolt 28, at which point the reflector is directed into a small curved extension 30 rearwardly bent and operating to deflect outwardly through opening 18 the light from lamp 17. The single reflector is useful for both tail-light and license plate, as is also the single lamp 17. Cap 14 may be readily removed and a license plate may be readily assembled with the housing.

A construction is provided which is compact, small, neat in design, of few parts, and simple in construction.

We claim—

In a device of the class described, the combination of a housing, an opening at the rear thereof, a reflector within said housing, a cap covering the rear of said housing, a flange on said cap fitting against said housing, a pair of supports extending along the side of said housing, a bolt for each support extending through the rear end of each support and through said flange and side wall of said housing, said supports converging towards each other from the front wall of said housing, a brace extending from said supports at the point of intersection thereof, means securing said brace to said supports, said brace extending to the front wall of said housing, and a bolt extending through said brace, said front wall, and said reflector.

In testimony that we claim the foregoing we have hereunto set our hands at Green Bay, in the county of Brown and State of Wisconsin.

OSCAR C. KRAENNIG.
JOHN M. REITER.